United States Patent [19]

Hyodo et al.

[11] Patent Number: 4,723,579
[45] Date of Patent: Feb. 9, 1988

[54] LINING MATERIAL FOR PIPE LINES

[75] Inventors: Masakatsu Hyodo; Isaburo Yagi, both of Settsu, Japan

[73] Assignee: Ashimori Kogyo Kabushiki Kaisha, Osaka, Japan

[21] Appl. No.: 902,455
[22] PCT Filed: Dec. 17, 1985
[86] PCT No.: PCT/JP85/00689
§ 371 Date: Aug. 15, 1986
§ 102(e) Date: Aug. 15, 1986
[87] PCT Pub. No.: WO86/03715
PCT Pub. Date: Jul. 3, 1986

[30] Foreign Application Priority Data

Dec. 17, 1984 [JP] Japan .................. 59-264617

[51] Int. Cl.$^4$ ............................ F16L 11/00
[52] U.S. Cl. ........................ 138/124; 138/97; 138/98; 138/119; 138/125; 138/128; 138/145; 428/36; 428/137; 428/138; 428/192
[58] Field of Search .............. 138/97, 98, 119, 124, 138/125, 128, 145; 139/387 R; 428/36, 137, 138, 192

[56] References Cited

U.S. PATENT DOCUMENTS

| 4,334,943 | 6/1982 | Zenbayashi et al. | 156/287 |
| 4,368,091 | 1/1983 | Ontsaga et al. | 156/287 |
| 4,600,615 | 7/1986 | Hyodo et al. | 428/36 |

FOREIGN PATENT DOCUMENTS 1449455 9/1976 United Kingdom .

Primary Examiner—James J. Bell
Attorney, Agent, or Firm—Birch, Stewart, Kolasch & Birch

[57] ABSTRACT

The present invention relates to a lining material suitable for reinforcing various pipe lines buried in the ground, which is made by inserting an unwoven fabric of a specific structure into the interior of a conventional air-impervious tubular fabric having a film of a synthetic resin on the exterior surface thereof and is passed through a pipe line while being evaginated under fluid pressure and which possesses earthquake-resistance and shape-maintaining property against external hydraulic pressure in addition to the characteristics required for conventional lining materials.

8 Claims, 4 Drawing Figures

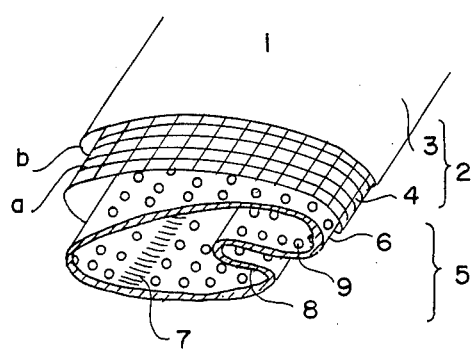
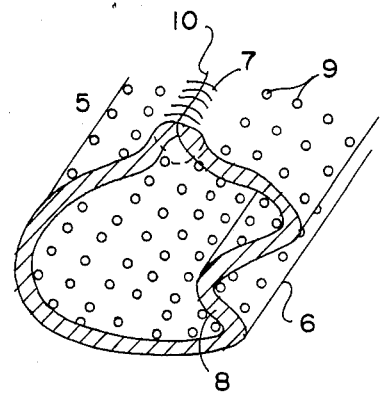
FIG. 1
FIG. 2
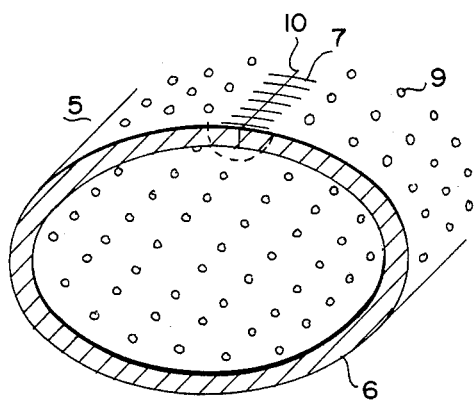
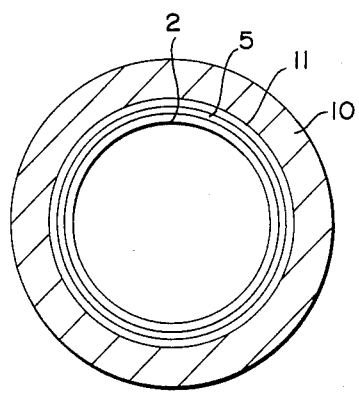
FIG. 3
FIG. 4

LINING MATERIAL FOR PIPE LINES

TECHNICAL FIELD

The present invention relates to a lining material for pipe lines, chiefly those buried in the ground, such as gas conduits, city water pipe lines, wage pipes, construction pipe lines like power transmission wires or telecommunication cables, oil pipe lines, etc. More particularly, the present invention relates to a lining material for the above described pipe lines which comprises an air-impervious tubular fabric provided on the external surface thereof with a film of a synthetic resin and capable of being inserted under evagination into the pipe lines, the tubular fabric having been provided on the inner surface thereof with a non-woven fabric having a specific structure, and thus possesses earthquake-resistance and shape-maintaining property against external hydraulic pressure in addition to the various properties required for conventional lining materials.

BACKGROUND ART

In recent years, the application of a lining material onto the surface of the above described pipe lines buried in the ground is carried out for the purpose of repair and reinforcement of the pipe lines when superannuated. One of the lining method is carried out in such manner that a lining material in the form of a tube is provided on the inner surface thereof with a binder and the lining material is inserted into a pipe line and allowed to advance therein while turning the lining material inside out under fluid pressure whereby the lining material is bonded onto the inner surface of the pipe line with the binder being interposed between the lining material and the pipe line (see, for example, U.S. Pat. Nos. 4,368,091 and 4,334,943 and Japanese Patent Publn. Nos. Sho. 58-38088, 58-51654 and 59-12911). This method need not dig up a pipe line over its full length and is operable simply by forming manholes at both terminal ends of the pipe line to be lined. The lining work itself can be done within a short period of time for a long pipe line and is operable for a pipe line having a number of bends, thus being regarded as an excellent method.

On the other hand, various kinds of lining materials have been proposed as the lining material for the lining method of this type, including a thin flexible plastic tube, a textile lining material which comprises a woven or non-woven fabric in the form of a tube provided on the exterior surface with an air-or water-impervious coating, etc.

In Japanese Patent Publn. No. Sho. 55-43890 (British Patent No. 1,449,455), for example, there is disclosed a lining material which is composed of a flexible resin-absorbing material comprising felt and/or fabric and a flexible foamed agent and having an impervious film coated thereon. Japanese Patent Publn. No. Sho. 58-33098 discloses a lining material manufactured from a flat web laminate comprised of resin-absorbing layers with an impervious layer on one side thereof, the both ends of which have been sewn with a thread to form a tubular shape having the impervious layer on the external surface, the sewn area being fully covered with a sealing ribbon or a coating as well as a method for manufacturing the lining material. U.S. Pat. Nos. 4,334,943 and 4,368,091 disclose a lining material comprising a textile jacket made of warps and a weft woven in a tubular form and overlaid with a resin. Further, Japanese Laid-open Utility Model Appln. No. Sho. 56-3619 discloses a lining material comprised of a similar tubular textile jacket having a flexible rubbery or plastic coat on the exterior surface thereof. In Japanese Laid-open Patent Appln. No. Sho. 56-8229 aiming at an improvement of the above lining material for pipe lines, there is disclosed a lining material comprised of a tubular textile jacket made of fibers woven into a tubular form having a coat of a flexible rubbery or plastic material on the external surface thereof and capable of expanding by 7-15% in outer diameter when a pressure equal to the minimum fluid pressure is applied. In Japanese Patent Appln. No. Sho. 58-102361, there is disclosed a lining material for pipe lines which is comprised of a tubular textile jacket consisting of warps and a weft made of synthetic fibers and woven in a tubular form laminated on its outer or inner surface with another tubular textile jacket having a given thickness and interstices in its interior and having on the exterior surface thereof an air-impervious layer of a synthetic resin.

On the other hand, when the pipe-lining methods of the above mentioned type are applied to pipe lines for transporting fluids, such as gas conduits, city water pipe lines, sewage pipes, oil pipe lines, etc., a tubular lining material used for these methods was originally required to possess a property of not permitting any leakage of the fluid being transported, flexibility capable of adapting the lining material in compliance with pipe lines even in curved portions, strength capable of withstanding the internal pressure of the fluid, durability of the coat, etc. As the pipe-lining methods of this type have been spread widely, however, various characteristics have been required for the tubular lining material according to the environment of the pipe lines to be treated and the nature of ground. At present, the following properties are required for the lining material:

(1) Earthquake-resistance:

In case a pipe line for transporting a fluid is cracked or broken by a strong external force such as earthquake, the lining material should be peeled off from the pipe line, without being destroyed together with the pipe line, to maintain by itself the function of a passageway for transporting the fluid. For this purpose, the lining material should have a combination of the earthquake-proofing propert and the earthquake-absorbing property. Such specific characteristics are defined hereinafter as "earthquake-resistance." In order to furnish a lining material with the earthquake-resistance, the lining material should possess a sufficiently high tenacity in lengthwise direction and a strength to such a degree that the lining material should not be broken down prior to shearing destroy of a binder. In case the pipe line buried in a soft ground or reclaimed land is cracked, broken off or disconnected by dip of the ground or the like cause, the lining material possessing the earthquake-resistance can maintain the function of a passageway to avoid any trouble. In recent years, possibility of earthquakes is predicted in many places according to the development of earthquake-predicting techniques. Thus, the earthquake-resistance is an important characteristic property for lining materials for pipe lines in districts where occurrence of earthquake is anticipated.

(2) Shape-maintaining property against external hydraulic pressure:

In case the pipe line is corroded to form a hole, the lining material should not be collapsed by the hydraulic pressure of underground water entered through the hole to narrow the flow path inside the pipe line. When the pipe line is broken off by earthquake or the like, the external pressure will directly be applied to the lining material. Thus, the lining material should also withstand this pressure. The performance capable of withstanding the external pressure without being collapsed to maintain the flow path is important for the lining material and is defined herein as the shape-maintaining property against external hydraulic pressure. The water-resistance and hardness of the binder are important for furnishing the lining material for pipe lines with the shape-maintaining property against external hydraulic pressure. It is further necessary that the binder has a sufficient thickness. Thus, the lining material is required to be impregnated with a sufficient amount of a binder.

From the past, epoxy resins, unsaturated polyester resins, acrylic resins and urethane resins are used as a binder of this type. As a pipe line may be constructed under the ground where underground water is intruded, the binder is required to have such property that the curing reaction proceeds without being disturbed even in water to effect cohesion and that the cohesive strength is not reduced by the influence of water after curing. From this viewpoint, unsaturated polyester resins and acrylic resins using a peroxide as the curing agent are not preferable as they may not be cured in the coexistence of water. Further, they are not desirable in the aspect of using styrene monomer as a solvent. Urethane resins are curable in water but troublesome in adjustment of their pot life, etc. and is not preferable in that the monomeric components are sometimes soluble in water, thus causing environmental pollution. Thus, binders suitable for the lining materials used for a pipe line of this type are epoxy resins among which those using an aromatic or aliphatic polyamine as a curing agent are preferred because they can be cured with certainty even in water.

However, it is difficult to reduce the viscosity of such epoxy resins, so that some device becomes necessary for impregnating the fibrous layer reliably with the resins. Even in case a thick fibrous layer has been impregnated with the epoxy resins, it is difficult to make the whole layer completely water-impervious so that a percolating phenomenon with water occurs under external hydraulic pressure. Consequently, the resinous film is also influenced by the external hydraulic pressure so that the film may, if its adhesion strength to the fibrous layer is weakened, be peeled off from the fibrous layer to block the flow path of a fluid. Thus, a higher adhesion strength between the resinous film and the fibrous layer is required as one of the conditions for withstanding the external hydraulic pressure. Since the shape-maintaining property against external hydraulic pressure depends on the thickness of the lining material, the fibrous layer used in the form of multiple layers has to be integrated entirely with a binder.

(3) Internal pressure-resistance:

In case a fluid-transporting pipe line is broken off, its lining material will withstand the fluid pressure. Thus, the lining material is required to be tolerant to the fluid pressure. Further, the lining material should not be broken, when it is applied to the pipe line, by fluid pressure necessary for evagination of the lining material. The lining material is thus required to have a considerable pressure-resistance.

(4) Flexibility:

In case of applying a lining material to a pipe line, the lining material is evaginated under fluid pressure. Thus, the lining material is required to be flexible and does not need any high pressure for evagination. This property is important since evagination of the lining material having a thick fibrous layer is difficult.

The above described prior art lining materials can satisfy a part of these necessary properties but fail to satisfy all of these properties.

For example, the lining materials disclosed in Japanese Patent Publn. Nos. Sho. 55-43890 and 58-33098 basically employ an unwoven fabric and can afford a lining material having a sufficient thickness as adjustment of the thickness is possible. However, the lining materials lack the earthquake-resistance because of poor strength of the unwoven fabric itself and are devoid of a device for being impregnated with an epoxy resin with certainty. The internal pressure-resistance of the lining materials is poor because of using the unwoven fabric, and moreover, there is found no means for enhancing the adhesion strength between the resinous film and the fibrous layer.

The lining materials disclosed in Japanese Laid-open Utility Model Appln. No. Sho. 56-3619 and Japanese Laid-open Patent Appln. No. Sho. 56-8229 basically employ a woven fabric and are extremely high in strength. The lining materials can further be enhanced in strength by modifying the fabric structure so that they may have increased earthquake-resistance and internal pressure-resistance, but on the other hand are difficult to increase the thickness of the fabric. In case of fabrics for general clothing, it is not difficult to obtain thicker fabrics by making device for the fabric structure. A tubular textile jacket for lining materials is woven in a tubular form by a rotary weaving machine which, however, cannot weave a fabric with a complicate structure. The fabric has to be woven thickly and furnished with a high tenacity as described above, but the thickness cannot be increased merely with a wadding or backing unlike a thick fabric for clothing. Although the use of thick threads may increase the thickness of fabrics, stiffness of the threads makes it difficult to evaginate the lining material on its application to pipe lines. Further, the surface of the fabric becomes coarse so that the flow resistance to a fluid to be transported is increased. The use of too thick threads makes the texture coarse so that the binder cannot be kept only with the fabric itself to deteriorate the shape-maintaining property against external hydraulic pressure. No consideration is made for the improvement in adhesion strength between the fabric layer and the resinous film.

The lining material disclosed in Japanese Patent Appln. No. 58-102361 satisfies all of the above mentioned necessary characteristic properties to a certain degree but there is made neither device on impregnation with a binder, especially on the means for fully impregnating an unwoven or woven fabric as a tubular textile jacket with an epoxy resin nor consideration on increase in adhesion strength between the tubular fabric and the resinous film and between the tubular fabric and the tubular unwoven fabric.

In such situation, there was a great demand for making further improvement in the lining material disclosed in Japanese Patent Appln. No. Sho. 58-102361 to develop an improved lining material which satisfies all of the above mentioned characteristic properties necessary for lining materials. The present invention has been accomplished, paying attention to the above situation, to make further improvement in the lining material disclosed in Japanese Patent Appln. No. Sho. 58-102361.

It is an object of the present invention to provide a lining material utilizable for pipe lines, especially those buried in the ground, which possesses a combination of the earthquake-resistance and the shape-maintaining property against external hydraulic pressure without deteriorating flexibility, properties for impregnation with a binder and internal pressure-resistance being in the possession of the prior art lining materials.

It is another object of the present invention to provide a lining material for pipe lines, which uses a tubular woven fabric and a tubular unwoven fabric as a tubular textile jacket and is improved in the properties for impregnation with a binder and the adhesion strength between the resinous film and the tubular woven fabric and between the tubular woven fabric and the tubular unwoven fabric and furnished further with the earthquake-resistance and the shape-maintaining property against external hydraulic pressure without deteriorating the characteristic properties own by the prior art lining materials.

It is still another object of the present invention to provide a lining material which uses a tubular woven fabric together with a tubular unwoven fabric of a special shape and structure having been placed inside the tubular woven fabric as a tubular textile jacket and satisfies all of the characteristic properties required for the lining materials for pipe lines.

DISCLOSURE OF INVENTION

As a result of extensive researches made by the present inventors to make further improvement in the characteristic properties of the lining material disclosed in Japanese Patent Appln. No. Sho. 58-102361, it has now been found that the drawbacks of the prior art lining materials are overcome by inserting inside a tubular woven fabric having a resinous film on the exterior surface thereof an unwoven fabric having been provided uniformly with open holes formed by punching and woven in a tubular form according to a specific weaving means, thus succeeding in obtaining a lining material which satisfies all of the required characteristic properties.

In accordance with the present invention, therefore, there is provided a lining material for pipe lines which is utilizable in a pipe-lining method wherein a tubular lining material with a binder on the inner surface thereof is inserted into the pipe lines and is allowed to advance within the pipe lines while evaginating the tubular lining material under fluid pressure thereby pressing the tubular lining material against the inner surface of the pipe lines and bonding the lining material onto the inner surface of the pipe lines with the binder being interposed between the lining material and the pipe lines, characterized in that the lining material comprises an air-impervious tubular fabric woven in a tubular form having a film of a synthetic resin on the exterior surface thereof and a tubular fabric to be impregnated with the binder which is comprised of an unwoven fabric having been provided almost uniformly with open holes formed by punching and inserted inside the air-impervious tubular fabric.

In accordance with the present invention, there is also provided a means for impregnating an unwoven fabric fully with a binder such as an epoxy resin and further impregnating an air-impervious tubular fabric through the unwoven fabric sufficiently with the epoxy resin to integrally binding the fabric with the unwoven fabric thereby enhancing strength of the fabrics to improve earthquake-resistance and maintaining the original shape of the fabrics without permitting delamination of the fabric and the unwoven fabric each in tubular form when any external hydraulic pressure is applied to the fabrics.

In the prior art lining material, especially a lining material using a tubular fabric and an unwoven fabric disclosed in Japanese Patent Appln. No. Sho. 58-102361, there is such a drawback that on impregnation of the tubular fabric with an epoxy resin suitable as a binder through the unwoven fabric, the binder cannot be penetrated in a sufficient amount into the tubular fabric on account of the unwoven fabric functioning as a filter. In case of the epoxy resin comprised of a resinous ingredient and a filler, a phenomenon of filtering off the filler with the unwoven fabric occurs on allowing the binder to pass through the unwoven fabric. Thus, there is a necessity of overcoming this drawback. According to the present invention, the unwoven fabric is provided with a great number of open holes uniformly distributed therein so that the separation of the ingredients of the binder can be prevented.

In the lining material of the present invention, the tubular fabric to be impregnated with a binder is comprised of a single layer of an unwoven fabric or laminated unwoven fabrics and has an outer diameter larger than the inner diameter of the air-impervious tubular fabric so that the tubular fabric to be impregnated with a binder is inserted in folded state in lengthwise direction into the air-impervious tubular fabric according to a proper means. The unwoven fabric used as a tubular fabric to be impregnated with a binder is characterized in that at least an unwoven fabric constituting the innermost layer is sewn into a tubular form in such manner that a long unwoven fabric belt is sewn at both longitudinal edges in an overedge chain stitch fashion so that the both edges sewn may not be overlapped each other. This unwoven fabric is comprised as a rule of synthetic fibers and those made of polyamide, polyester, acrylic type and polyurethane can be employed. An unwoven fabric made of polyester fibers according to a conventional method, for example, a dry laid spun-bond method is particularly suitable. This unwoven fabric is desirably of one made of a polyester fiber yarn having a monofilament fineness of 2–8 d. Although the thickness of the unwoven fabric can vary according to the intended purpose and is thus not limited, it is usually 2–8 mm. The open holes formed in the unwoven fabric by punching or the like means is 2–8 mm$\phi$ in case the unwoven fabric has the above mentioned thickness. Distribution of the holes is preferably such that the minimum distance is 15–60 mm at an interval between the holes.

On the other hand, the air-impervious tubular fabric has a structure as disclosed, for example, in U.S. Pat. Nos. 4,334,948 or 4,368,091 and is a tubular fabric woven in a tubular form with a weft made of synthetic fibers and warps made of synthetic fibers and provided on the exterior surface thereof with a coat of a synthetic resin. Utilizable as the synthetic fibers are those of polyamide, polyester, acrylic and polyurethane series but the use of the polyester series is preferably in view of their high tenacity. In the tubular fabric, a twisted non-stretchable long filament yarn made of polyester fibers or an intertwisted yarn of the twisted non-stretchable long filament yarn with a polyester long filament yarn or a polyester short filament yarn is preferably used for at least one of the warps and the weft.

As a synthetic resin used for the coat of the synthetic resin is preferably a polyester elastic resin, considering strength, durability and compatibility with the fabric.

A binder of an epoxy series is preferably used as a binder to be incorporated into the tubular fabric. It is preferred to use an aromatic or aliphatic polyamine as a curing agent.

BRIEF DESCRIPTION OF THE DRAWINGS

FIG. 1 is a partially broken perspective view showing a representative example of the lining material of the present invention.

FIG. 2 is a perspective view showing the tubular fabric to be impregnated with a binder in FIG. 1.

FIG. 3 is a perspective view showing the tubular fabric to be impregnated with a binder stretched in the circumferential direction thereof.

FIG. 4 is a cross sectional view showing the cross section of a pipe line to which the lining material of the present invention has been applied.

BEST MODE FOR CARRYING OUT THE INVENTION

The present invention will be explained in more detail by way of the annexed drawings. In FIG. 1 showing a representative example of the lining material of the present invention by a partially broken perspective view, a lining material 1 is comprised of an air-impervious tubular fabric 2 which comprises a tubular fabric 4 having on its external surface a film 3 of a synthetic resin and a tubular fabric 5 to be impregnated with a binder which has been made by sewing an unwoven fabric 6 in lengthwise direction thereof with a thread 7 to form a tubular form, the tubular fabric 5 being inserted into .the inside of the tubular fabric 2. As the outer diameter of the tubular fabric 5 is larger than the inner diameter of the tubular fabric 2, the former is in folded state at a turnover 8 in lengthwise direction. In the unwoven fabric 6 there are present a number of open holes 9 almost uniformly distributed. The tubular fabric 4 in the tubular fabric 2 is woven with warps a and a weft b each made of synthetic fibers in tubular form.

FIG. 2 is a perspective view showing the tubular fabric 5 alone in FIG. 1, wherein both ends 10 of the unwoven fabric 6 in lengthwise direction are sewn in an overedge chain stitch fashion with a thread 7. In the state shown in FIG. 2, the tubular fabric 5 is folded at the turnover 8 so that both ends 10 sewn by the thread 7 form a projection. FIG. 3 is a perspective view showing the tubular fabric 5 in case of being used for lining a pipe line, wherein the tubular fabric 5 is stretched in its circumferential direction so that the turnover 8 disappears and the projection at both ends 10 also disappear to make the cross section of the tubular fabric circular, thus showing the character of the sewing in an overedge chain stitch.

The construction of the lining material of the present invention will now be illustrated in more detail by way of a specific example wherein the lining material of the present invention is applied to a Hume concrete pipe for use in sewage having a nominal diameter of 300 mm. A tubular fabric 4 was made by weaving warps a and a weft b in a tubular form in such manner that two groups of 320 yarns (640 yarns in all) each of which was made by twisting six 1,000 d. twisted non-stretchable polyester filament yarns (iilament number: 288) were used as warps a and a yarn made by twisting eight 1,000 d. similar twisted non-stretchable yarns was used a weft b and picked up at 35 pick count/10 cm so that the tubular fabric might have a width of about 490 mm in flattened state. This fabric was subjected to a heat treatment to contract the width to about 445 mm in flattened state. The tubular fabric 4 in this state had a thickness of about 1.8 mm, a tensile strength in lengthwise direction of about 210 kg per cm in width, and a pressure-resistance of about 8 kg/cm$^2$.

The tubular fabric 4 is provided on the exterior surface thereof with an air-impervious film 3 of a synthetic resin. This film 3 is formed by direct coating of a generally colorless polyester elastic resin on the exterior surface of the tubular fabric 4 according to an extrusion molding method. The thickness of the film is about 0.6 mm. In general, a thickness of about 0.2-1.5 mm is adequate. The air-impervious tubular fabric 2 is thus formed. The tubular fabric 4 is further contracted by the treatment with an extruder for forming the film 3 so that the width of the air-impervious tubular fabric 2 in flattened state after the film 3 has been formed is 440 mm.

The tubular fabric 5 to be impregnated with a binder is processed to have open holes 9 according to a punching treatment at a stage before being sewn to form a tubular form. In this case, the diameter of the open holes 9 is about 3.5 mm and the minimum distance between the open holes is about 2.5 cm in terms of the length between the centers of the open holes. This punching treatment is carried out by using a conventional punching machine in such manner that the fibers are completely cut to form open holes. The unwoven fabric 6 used in this case is made according to a conventional method wherein polyester long filament yarns having a monofilament fineness of about 5 denier are subjected to needle-punching to form an unwoven fabric of about 4 mm in thickness. The basis weight (weight per square meter) of this unwoven fabric was about 420 g/m$^2$. This unwoven fabric is sewn at both ends in lengthwise direction thereof to become tubular by an overlock sewing (overedge chain stitching) machine lest both ends should not be overlapped whereby the tubular fabric 5 to be impregnated with a binder is formed. According to the overlock sewing (overedge chain stitches), an unwoven fabric having a given width is overlapped at both ends and sewn at a width of about 10 mm. When the tubular fabric 5 is stretched in circumferential direction, both ends thereof in stitched state are not overlapped each other. This tubular unwoven fabric 6 had a width of about 460 mm in flattened state. The tubular fabric 5 is then inserted into the tubular fabric 2 in a proper method. The lining material 1 in this state is shown in FIG. 1.

Next, an explanation will be given hereunder for a method for applying this lining material 1 onto the inner surface of a Hume concrete pipe.

The lining material 1 is first provided on the inner surface thereof with a binder of epoxy type. The binder is applied to the lining material 1 by evacuating the inside of the lining material and injecting the binder. The lining material is then passed between nip rolls whereby the binder is squeezed and uniformly spread over the full length of the lining material 1. It is preferred to use the hereinbefore described aromatic polyamine as a curing agent for the binder. More specifically, used in this example was an epoxy binder consisting of an epi-bis type epoxy resin as a main ingredient and a modified aromatic polyamine as a curing agent and having a mixed viscosity of 5,000 cps (measured by a B-type rotary viscosimeter in accordance with JIS K6833, Item 3,6). Calcium carbonate was used as a filler. This binder was applied in an amount of about 6 kg/cm² onto the inner surface of the lining material. The lining material provided with the binder is then applied onto the inner surface of the pipe according to a known adequate method, for example, the lining method under evagination as disclosed in U.S. Pat. No. 4,334,943 wherein the lining material is introduced into the pipe while evaginating the lining material to line the pipe therewith under fluid pressure and the binder is then cured by heating with steam or the like. In this case, the pressure required for the evagination (turning inside out) was 0.8 kg/cm². The lining material was thus applied onto the inner surface of the Hume concrete pipe.

FIG. 4 shows a cross section of the Hume concrete pipe lined in this manner wherein the inner surface of the Hume concrete pipe 10 is provided with a binder layer 11 on which the tubular fabric 5 and the tubular fabric 2 integrally bonded to the binder are positioned. In this case, the film of the synthetic resin forms the innermost layer of the lining material.

The lining material of the present invention has the tubular fabrics and a satisfactory strength in lengthwise direction and thus exhibits earthquake-resistance. In a test for earthquake-resistance wherein Hume concrete pipes of 300 mmφ having a length of 1 m were merely contacted with each other and provided on the inner surface thereof with the lining material to make a test sample and tensile loads were then applied onto both ends of the test sample, the lining material was detached from the Hume concrete pipes under a load of about 9 tons. When the open width at both ends of the detached pipes reached 70 mm, the tensile loads were 10.5 tons. The Hume concrete pipes formed cracks in diametric direction. The lining material peeled off from the Hume concrete pipes showed no damage, thus constituting a rigid pipe. When a pipe line is destroyed by earthquake or the like, therefore, the energy is absorbed by detaching the lining material from the pipe line and slight elongation of the lining material without causing any destroy of the lining material, thus permitting it alone to function fully as a passageway for a fluid.

The strength in lengthwise direction of the tubular fabrics basically receives as stress a force acting for peeling off the lining material from the pipe. Judging from the result of this test, the lining material will not be damaged if the strength in lengthwise direction is higher than 120 kg per cm. It can be said that it is difficult to obtain a material strong lengthwise direction other than fabric.

When a binder is applied to the lining material of the present invention provided with the tubular fabric 5 in which a number of open holes are uniformly distributed, a large amount of the binder is penetrated only into the unwoven fabric but also into the tubular fabric 2 through the open holes. The existence of the open holes eliminates the hereinbefore described filtering phenomenon by the unwoven fabric, thus bringing about such advantage that the binder ingredients are homogeneously supplied to the tubular fabric 2. Consequently, the tubular fabric 2 and the tubular fabric 5 can be bonded integrally to form a thick layer when they are cured after being applied to the pipe line. A thick fibrous layer of the lining material is impregnated on account of the existence of the open holes with a large amount of the binder and forms, in the state of applying the lining material to a pipe line, a rigid pipe within the pipe line. Thus, the lining material is not collapsed and maintains the above mentioned shape-maintaining property against external hydraulic pressure even in case of a hole having been formed in the pipe line or in case of a hole being formed newly to permit intrusion of underground water. To let the lining material have a sufficient thickness, the tubular fabric 5 is preferably 2-8 mm in thickness in case of being used as a single layer. If the thickness is less than 2 mm, the lining material will not maintain the sufficient thickness. On the other hand, if the thickness is larger than 8 mm, the tubular fabric 5 will not be impregnated uniformly with the binder. A dry laid spun-bonded fabric made of a polyester fiber yarn of 2-8 denier is preferable as the tubular fabric 5 as it is excellent in strength and impregnation with the binder. The open holes are preferably formed by completely cutting the textile by a Thomson's punching machine or the like as the fabric with such open holes are excellent in permeability of and impregnation with the binder.

It is preferred that the open holes are 2-8 mmφ in size and are formed uniformly all over the fabric in such manner that the minimum interval between the open holes may be about 1.5-6 cm. If the open holes are too small or the interval is too large, the impregnating effect of the tubular fabric 2 with the binder will become poor. On the other hand, if the open holes are too large or the interval is too small, it may result in any reduction in strength of the lining material.

In addition, the peeling strength between the tubular fabric and the tubular unwoven fabric is increased to promote integral bonding of the tubular fabric and the tubular unwoven fabric by the formation of the open holes. On investigation of the peeling strength (180°) between the tubular fabric 2 and the tubular fabric 5 made by the present inventors with respect to samples having the open holes in the unwoven fabric and those having no open holes in the unwoven fabric, it was found that the peeling strength of the samples having the open holes was 6-7 kg/cm while those having no open holes was 3-4 kg/cm.

In case the diameter of the pipe line becomes larger or in case the pipe line may receive a larger external hydraulic pressure, it would be better to increase the thickness of the unwoven fabric. In this case, the unwoven fabric is preferably comprised of multiple layers such as double or triple layers since a limitation exists in the thickness of the single layer.

It is a matter of course also in this case that each unwoven fabric layer is made to have a thickness of 2-8 mm and the open holes are formed in each layer. By virtue of the open holes, impregnation of the unwoven fabric, with the binder becomes so enough that any delamination will hardly occur between the individual unwoven fabric.

In the above example, the width of the air-impervious tubular fabric is 440 mm in flattened state (about 280 mmφ in outer diameter) and that of the inner tubular fabric to be impregnated with the binder is 460 mm. (293 mmφ in outer diameter). air pressure of about 0.5 kg/cm² so that both of the air-impervious tubular fabric and the tubular fabr c to be impregnated with the binder can be used in wrinkle-free state for lining. Such better expansiveness results from the fact that since the original width 490 mm (about 312 mmφ in outer diameter) of the air-impervious tubular fabric in flattened state has been reduced by a thermal treatment, the tubular fabric is inflated to become larger than the inner diameter of the pipe line under a weak pressure and that the diameter of the tubular fabric to be impregnated with the binder is designed to be larger than that of the air-impervious tubular fabric. Further, the use of the tubular fabric to be impregnated with the binder which is larger in diameter than the air-impervious tubular fabric permits slip between the tubular fabric and the tubular unwoven fabric in the width of the air-impervious tubular fabric and makes the lining material flexible whereby fluid pressure necessary for evaginating the lining material can be reduced. When the unwoven fabric is made thicker with multiple layers, the innermost layer alone may be sewn, merely piling the intermediate layers. If the innermost layer is not sewn, the unwoven fabric will be slipped off on evagination of the lining material to cause occurrence of undesirable wrinkles. When the tubular unwoven fabric is comprised of multiple layers, it is desirable that the unwoven fabric layer is larger in diameter than the air-impervious tubular fabric and that the unwoven fabric layer is increased in diameter as the location of the layer becomes inner to facilitate evagination of the lining material. However, it is necessary that the diameters of all the layers are somewhat smaller than the diameter of the pipe line.

The use of the twisted non-stretchable long filament yarn for the tubular fabric can enhance the peeling strength between the exterior film of the synthetic resin and the tubular fabric. In the foregoing example wherein the twisted non-stretchable long filament yarn is used for all of the warps and the weft, the peeling strength (peeling at 180°) between the tubular fabric and the film of the synthetic resin was about 10 Kg/cm. This is ihdeed about 5-10 times strong as compared with the case of about 1-2 Kg/cm wherein a long filament yarn alone isused. Thus, there is no fear of the film being peeled off when external hydraulic pressure is applied from the outside, i.e. the side of the tubular fabric. Such phenomenon is considered to be ascribable to the fact that the twisted non-stretchable long filament yarn is so bulky as to permit intrusion of the resin forming the film into the filament yarn to attain an anchoring effect and that the yarn is hardly come out from the fabric on account of the long filament yarn to attain enhancement of the peeling strength.

It is unnecessary to use the twisted non-stretchable long filament yarn for both of the warps and the weft. The same effect will be achieved by using the twisted non-stretchable long filament yarn intertwisted with an ordinary long filament yarn or a short filament yarn.

In contrast to an ordinary woolly yarn which is subjected to a crimping treatment under dry heating, the twisted non-stretchable long filament yarn is subjected to a crimping treatment under wet heating by steam or the like whereby the yarn in curly state is set at a high temperature to minimize elongation. Accordingly, the twisted non-stretchable long filament yarn is similar in shape to an ordinary woolly yarn but has an elongation as low as 20% and high strength. In aspect of strength, it is desirable to use polyester fibers for either of the fabric and the unwoven fabric. The polyester is desirable also in aspect of high chemicals-resistance and abrasion-resistance in addition to durability. Similarly, a polyester elastic resin is desirably used as a resin for the film and furnishes it with chemicals-resistance and abrasion-resistance in addition to strength. The use of a non-colored film is advantageous in that the resin itself is transparent and so permits external observation for checking whether or not the resin has been intruded into the texture of the tubular fabric through the unwoven fabric.

INDUSTRIAL APPLICABILITY

The lining material of the present invention possesses excellent earthquake-resistance and shape-maintaining property against external hydraulic pressure in addition to the characteristics of the conventional lining materials and is thus especially suitable for reinforcing pipe lines buried in soft ground or reclaimed land. Further, the lining material of this invention can be utilized for reinforcing various pipe lines including gas conduits, petroleum pipe lines, city water pipe lines, sewage pipes and underground power transmission wires.

We claim:

1. A lining material for pipe lines which is utilizable in a pipe-lining method wherein a tubular lining material with a binder on the inner surface thereof is inserted into the pipe lines and is allowed to advance within the pipe lines while evaginating the tubular lining material under fluid pressure thereby pressing the tubular lining material against the inner surface of the pipe lines and bonding the lining material onto the inner surface of the pipe lines with the binder being interposed between the lining material and the pipe lines, characterized in that the lining material comprises an air-impervious tubular fabric woven in a tubular form having a film of a synthetic resin on the exterior surface thereof and a tubular fabric to be impregnated with the binder which is comprised of an unwoven fabric having been provided almost uniformly with open holes formed by punching and inserted inside the air-impervious tubular fabric.

2. A lining material for pipe lines according to claim 1, wherein the tubular fabric to be impregnated with the binder has an outer diameter larger than the inner diameter of the air-impervious tubular fabric and is inserted in folded state in lengthwise direction into the air-impervious tubular fabric.

3. A lining material for pipe lines according to claim 2, wherein the tubular fabric to be impregnated with the binder is comprised of a single layer of an unwoven fabric or laminated unwoven fabrics.

4. A lining material for pipe lines according to claim 3, wherein an unwoven fabric constituting the innermost layer is sewn into a tubular form in such manner that a long unwoven fabric belt is sewn at both longitudinal edges in an overedge chain stitch fashion.

5. A lining material for pipe lines according to claim 4, wherein the unwoven fabric is a dry laid spun-bond fabric made of a polyester fiber yarn having a monofilament fineness of 2-8 d.

6. A lining material for pipe lines according to claim 5, wherein the unwoven fabric has a thickness of 2-8 mm and the open holes formed therein has a hole diameter of 2-8 mm and is distributed at a minimum distance of 15-60 mm at an interval between the open holes.

7. A lining material for pipe lines according to claim 1, wherein the air-impervious tubular fabric uses a polyester elastic resin for the film of the synthetic resin.

8. A lining material for pipe lines according to claim 7, wherein the air-impervious tubular fabric uses for at least one of the warps and the weft of the fabric a twisted non-stretchable long filament yarn made of polyester fibers or an intertwisted yarn of the twisted non-stretchable long filament yarn with a polyester long filament yarn or a polyester short filament yarn.

* * * * *